March 23, 1943.    L. B. LIFCHULTZ    2,314,504
LEASH
Filed July 5, 1940    2 Sheets-Sheet 1

Inventor:
Leo B. Lifchultz

March 23, 1943.  L. B. LIFCHULTZ  2,314,504
LEASH
Filed July 5, 1940  2 Sheets-Sheet 2

Inventor:
Leo B. Lifchultz
By: Freeman, Sweet & Albrecht
Attys.

Patented Mar. 23, 1943

2,314,504

UNITED STATES PATENT OFFICE 2,314,504

LEASH

Leo B. Lifchultz, Chicago, Ill.

Application July 5, 1940, Serial No. 344,007

3 Claims. (Cl. 242—98)

My invention relates to the control of dogs and other similar animals, and includes among its objects and advantages the provision of an improved leash constructed and arranged to enable the user to employ his full strength, if need be, in controlling the animal without discomfort, and at the same time to call for a minimum of constraint or manipulation of the leash at times when maximum effort is not called for.

Figure 4:
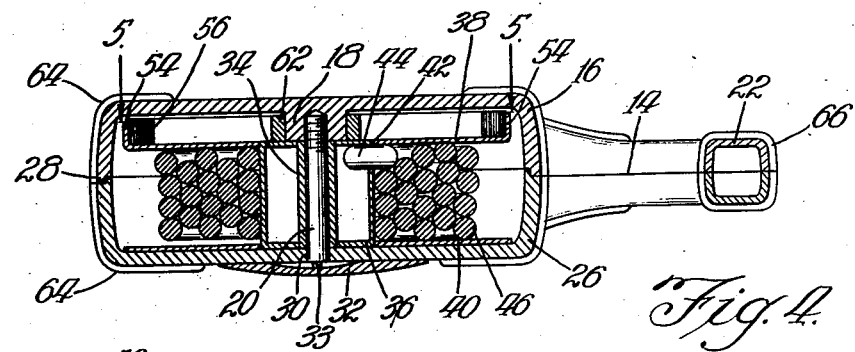
Figure 4 is a section on line 4—4 of Figure 1.
Figure 5:
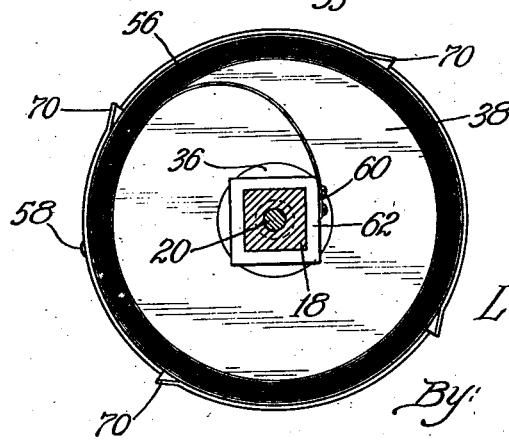
Figure 5 is a section on line 5—5 of Figure 4.

In the embodiment of the invention selected for illustration, the device comprises a casing 10 and a bail 12. The portion of the bail 12 gripped by the fingers of the user is substantially concentric with the center of the housing 10, and the bail is long enough so that all four fingers of the user's hand can encircle it comfortably, to secure a grip that will be firm and limited only by the strength of the user. The entire device is split into substantially equal halves along the line 14 of Figure 4, each half including a bail portion integral with the housing portion, and preferably being made of a resinous condensate material commonly referred to in the trade as plastic material. The upper piece 16, as viewed in Figure 4, comprises a downwardly facing cup portion provided with a central boss 18 threaded to receive the end of the fastening bolt 20 and the upper bail portion 22 suitably braced by internal ribs 24. The lower half frame 26 may be identical with the upper half 16 except for the joint at 28 and the omission of such a boss as 18, leaving a small hole 30 to receive the bolt 20. Over the head of the bolt 20 I have indicated a cover plate 32 which may be of the same kind of plastic as the housing and may be simply cemented in place as by putting a drop of acetone on the inter-engaging surfaces of the housing and plate and pressing them together. The plate 32 has a rib 33 entering a slot in the head of the bolt 20 to prevent the bolt from working loose.

Pivoted on the bolt 20 is a spool comprising a central sleeve 34. The hub 36 and the end plates 38 and 40 suitably united together into a rigid integral unit. The hub 36 is apertured at 42 to receive the end 44 of the cord 46 which is wound up between the end plates 38 and 40. The casing includes a tangential outlet 48 reinforced by a metal lip 50 through which outlet the cord 46 finds an exit. The end of the cord is provided with suitable means for attaching it to the harness or collar worn by the dog or other animal. I have indicated a conventional snap hook 52 for this purpose. The end plate 38 has a peripheral flange 54 defining a shallow cup within which is housed the spiral spring 56. The outer end of the spring may be riveted to the lip 54 as at 58, and the inner end is fastened at 60 to a metal square 62 telescoped over the boss 18. The parts are so assembled that as the cord is withdrawn, the rotation of the spool increases the tension of the spring 56, and the spring 56 at all times tends to wind in the cord with a force sufficient to prevent the portion of the cord outside the housing from sagging materially but not sufficient to materially restrain the movement of the animal. Thus when the animal moves away from the user and the limit of the length of the cord has not been reached, the cord pays out freely, but if the animal and the user come closer together, it is not necessary for the user to pick up slack in the cord because the spring will retrieve the cord as fast as the user and the animal move toward each other.

I have indicated reinforcing ribs 64 on the housing and 66 on the bail, which ribs contribute to the strength of the frame work of the device and also give it an ornamental external appearance. Similarly, the enlargement of the bail where it joins the housing is strengthened and at the same time ornamented by flutings 68.

Figure 1:
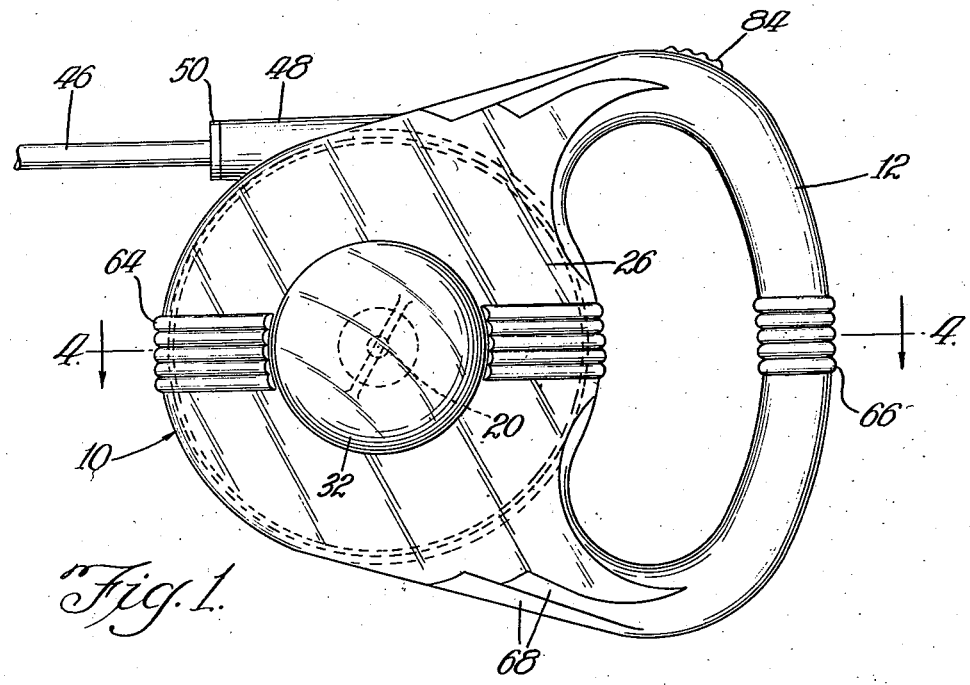
Figure 1 is a side view and Figure 2 an edge view of a leash according to the invention.
Figure 2:
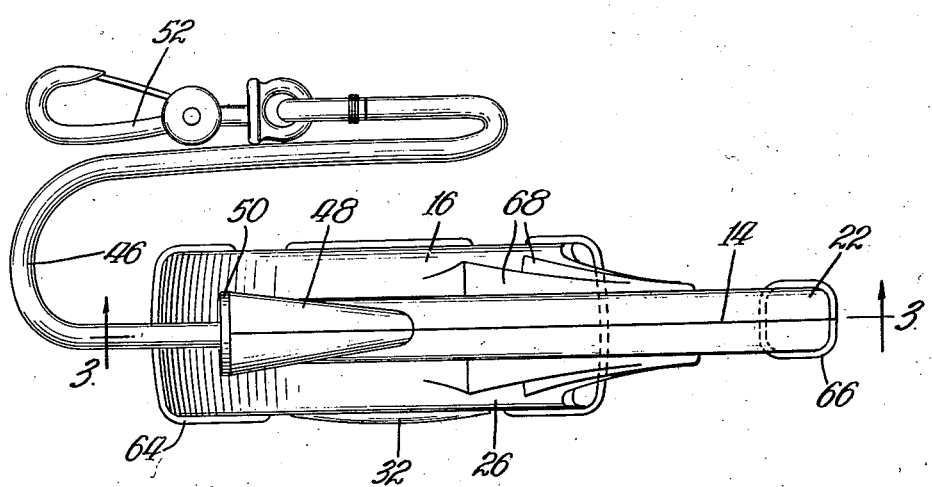
Figure 3:
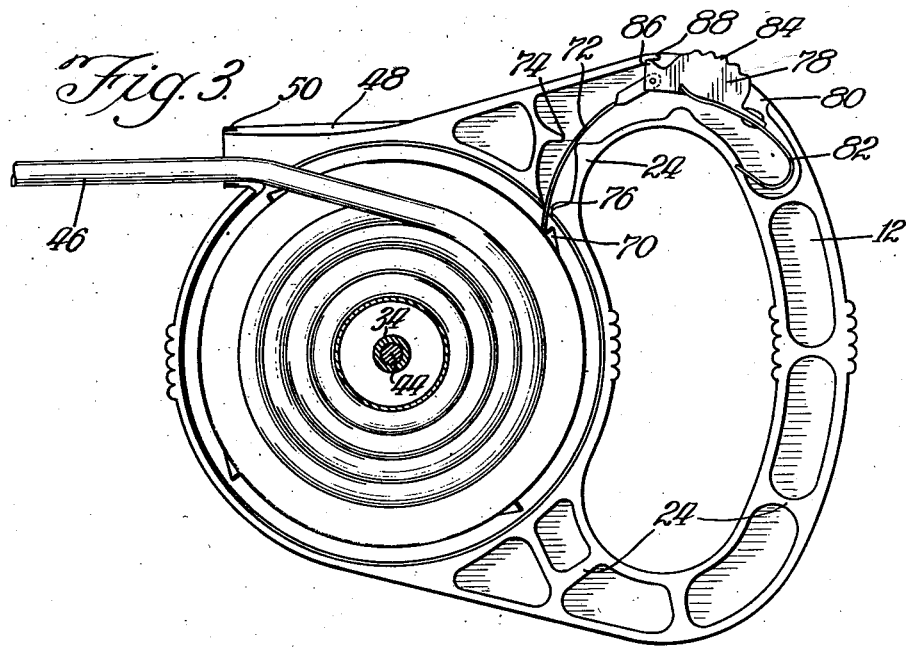
Figure 3 is a view of one-half of the leash, substantially as in section on line 3—3 of Figure 2.

I have provided quick acting lock means to enable the user at any time to lock the spool in such a way as to prevent it from turning in either direction. This enables the user to exert maximum forces on the animal, when desired, without either taking hold of the cord with the other hand or waiting until the cord is paid out for its entire length. The periphery of the cup housing the spring 56 carries four ears 70 struck out from the lip 54. The locking blade 72 is suitably guided in slots at 74 and 76 in the ribs 24; and in the position shown in Figure 3, positively prevents rotation of the spool in the direction of paying out the cord. As a rule it will frequently prevent the spring from winding in the cord, but if the lip 54 happens to slip a little, only a few inches of cord will be wound in until the back of the next projection 70 strikes the blade 74 and inward movement is at an end. To actuate the blade 74 I provide a thumb piece 78 housed in and partly projecting from an opening 80 in the bail 12. The leaf spring 82 normally holds the locking mechanism in inoperative position, but the thumb of the user normally lies on or adjacent the knurled projecting edge 84 of the lock control member 78 so that the user can immediately move the parts to the position of Figure 3, in which position the hook 86 enters a notch near the end wall 88 of the frame and is held engaged in that notch by the tension of the spring 82. Thus, in any emergency, a touch of the user's thumb on the knurling at 84 will move the parts to the position of Figure 3, and the user has as much control of the animal as he would have if he were gripping the cord 46 directly with his hands, plus the additional advantage of the large smooth surface of the bail 12 to grasp, by means of which bail he can exert larger forces on the cord than he could without cutting his fingers if he were forced to grip the cord itself.

Without further elaboration the foregoing will so fully explain my invention that others may, by applying knowledge current at the time of application, readily adapt the same for use under various conditions of service.

I claim:

1. A leash for animals comprising, in combination: a housing; a rigid bail integral with said housing and adapted to receive and be gripped by four fingers of the right or left hand of the user; a bolt in said housing; a spool in said housing pivoted on said bolt; said spool having plates defining a cord-holding groove; one of said plates having a peripheral flange turned away from said groove to define a cup-shaped cavity; a spiral spring housed in said cavity; the outer end of said spring being fastened to said plate; said housing having an inwardly projecting boss concentric with said cavity; the inner end of said spring being fastened to said boss; said housing having a substantially tangential outlet in the plane of said groove; a cord wound in said groove; the inner end of said cord being fastened to said spool; the outer end of said cord extending out through said outlet; a swiveled snap hook on the end of said cord; the diameter of said housing being not greater than the length of said bail, whereby the cord tension reaches the fingers of the user without tending to twist the housing in the user's hand; lock means adapted when in locking position to prevent movement of the spool in either direction; resilient means normally holding said lock means in inoperative position; a thumb piece mounted on said lock means and housed in said bail near the end adjacent said outlet; said thumb piece and bail having interlocking irregularities of contour adapted to hold said lock means in operative position when placed in engagement by the operator; said housing and bail being of plastic material and split centrally in a plane normal to the axis of said spool; said bolt having a flanged head abutting one half of said housing, and an end threaded into the other half, and holding said housing in assembled condition; and a cover plate of the same plastic material as said housing, overlying said bolt head and cemented to said housing; the tension of said spring in all positions being sufficient to keep the withdrawn portion of said cord from sagging and to retrieve said cord when the animal moves toward the user; but insufficient to restrain movement of the animal away from the user.

2. A leash for animals comprising, in combination: a housing; a rigid bail integral with said housing and adapted to receive and be gripped by the fingers of the right or left hand of the user; reel means in said housing; a cord wound on said reel means; the outer end of said cord extending out of said housing; said housing and bail being of plastic material and split centrally in a plane normal to the axis of said reel means; a bolt coaxial with said reel means and having a flanged head abutting one half of said housing, and an end threaded into the other half, and holding said housing in assembled condition; and a plastic cover plate of the same material as said housing, overlying said bolt head and cemented to said housing.

3. A leash for animals comprising, in combination: a housing; a rigid bail integral with said housing and adapted to receive and be gripped by four fingers of the right or left hand of the user; a bolt in said housing; a spool in said housing pivoted on said bolt; said spool having plates defining a cord-holding groove; said housing having a substantially tangential outlet in the plane of said groove; a cord wound in said groove; the inner end of said cord being fastened to said spool; the outer end of said cord extending out through said outlet along a line intersecting said bail, whereby the cord tension reaches the fingers of the user without tending to twist the housing in the user's hand; said housing and bail being of plastic and split centrally in a plane normal to the axis of said spool; said bolt having a flanged head abutting one half of said housing, and an end threaded into the other half, and holding said housing in assembled condition; and a plastic cover plate of the same material as said housing, overlying said bolt head and cemented to said housing; the tension of said spring in all positions being sufficient to keep the withdrawn portion of said cord from sagging and to retrieve said cord when the animal moves toward the user; but insufficient to restrain movement of the animal away from the user.

LEO B. LIFCHULTZ.